United States Patent

[11] 3,587,272

| [72] | Inventor | Daniel A. Zmuda<br>Toledo, Ohio |
|---|---|---|
| [21] | Appl. No. | 786,981 |
| [22] | Filed | Dec. 26, 1968 |
| [45] | Patented | June 28, 1971 |
| [73] | Assignee | Oldberg Manufacturing Company, Grand Haven, Mich. |

[54] INTERNALLY KNURLED BODY AND METHOD AND APPARATUS FOR FORMING SAME
6 Claims, 13 Drawing Figs.

| [52] | U.S. Cl. | 72/122, 72/703 |
|---|---|---|
| [51] | Int. Cl. | B21d 3/02 |
| [50] | Field of Search | 72/122; 29/263; 72/703 |

[56] References Cited
UNITED STATES PATENTS

| RE24,714 | 10/1959 | Bennett | 72/703 |
|---|---|---|---|
| 2,798,391 | 7/1957 | Bennett | 72/703X |
| 3,119,289 | 1/1964 | Bach | 72/703X |
| 2,684,604 | 7/1954 | Froberg | 72/703X |
| 2,618,182 | 11/1952 | Teetor | 72/703X |
| 1,171,590 | 2/1916 | Campbell | 29/263 |
| 736,991 | 8/1903 | Matthews | 29/263 |

*Primary Examiner*—Richard J. Herbst
*Assistant Examiner*—A.L. Havis
*Attorney*—Harry O. Ernsberger ABSTRACT: The disclosure embraces an internally knurled body and particularly a clamp body construction of a character for clamping cylindrical bodies or tubing or the like wherein the internal surfaces of the clamp construction are knurled to provide diamond-shaped gripping surfaces for exerting high gripping force, and to an apparatus or tool and method of using same to form diamond-shaped knurling or interior surface areas of a body.

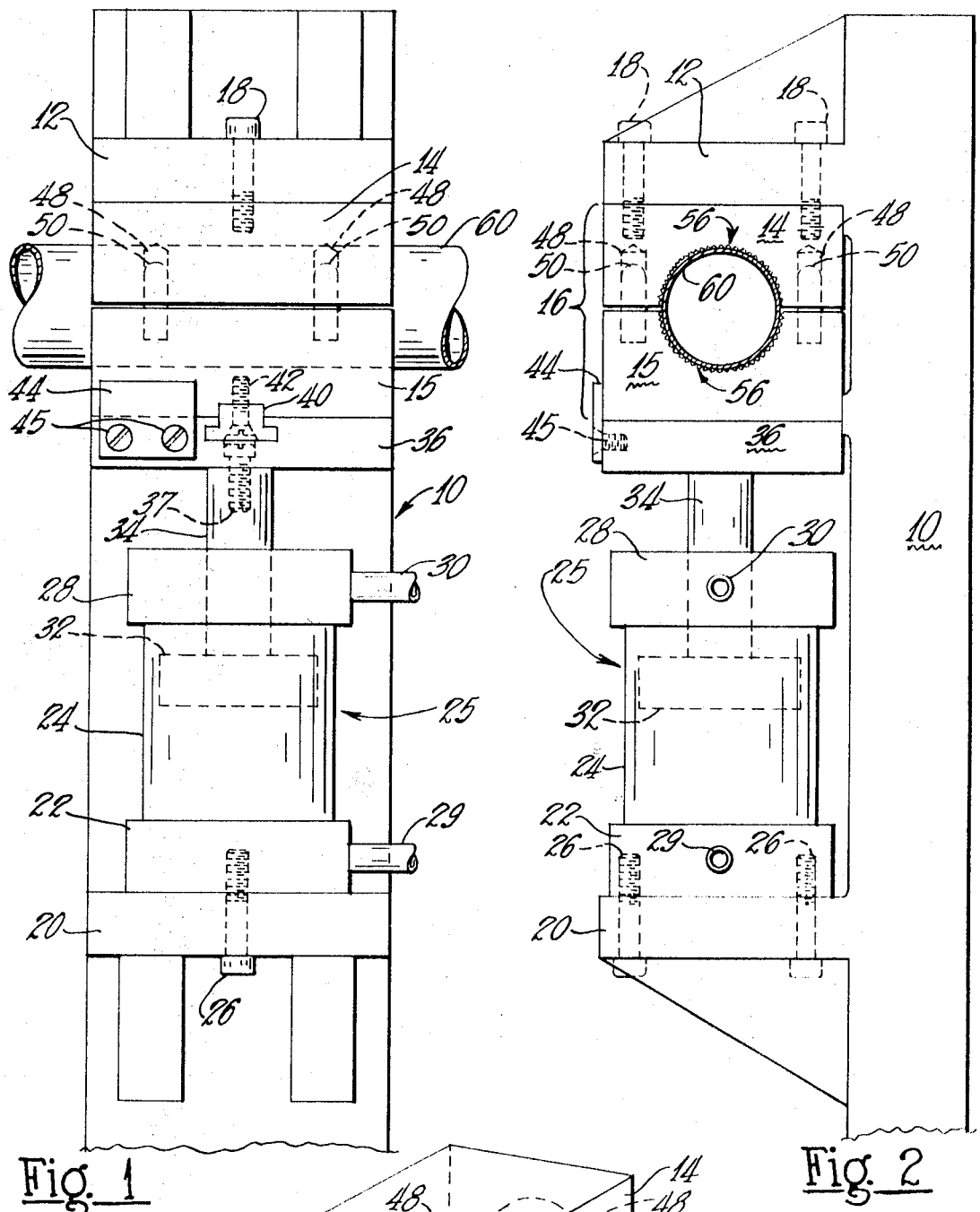
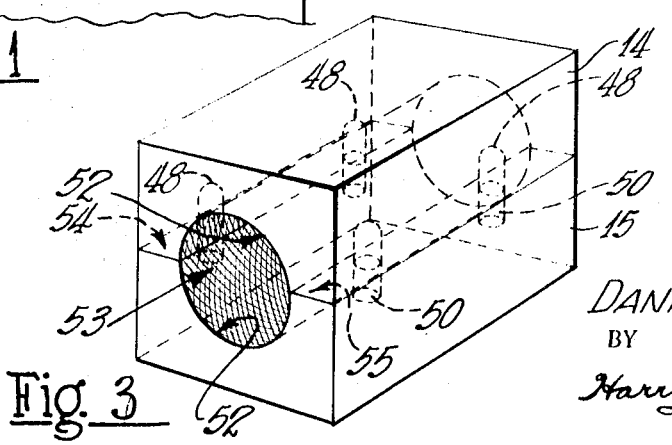
PATENTED JUN 28 1971
3,587,272
SHEET 1 OF 2
Fig. 1
Fig. 2
Fig. 3
INVENTOR.
DANIEL A. ZMUDA
BY
Harry O. Ernsberger
ATTORNEY

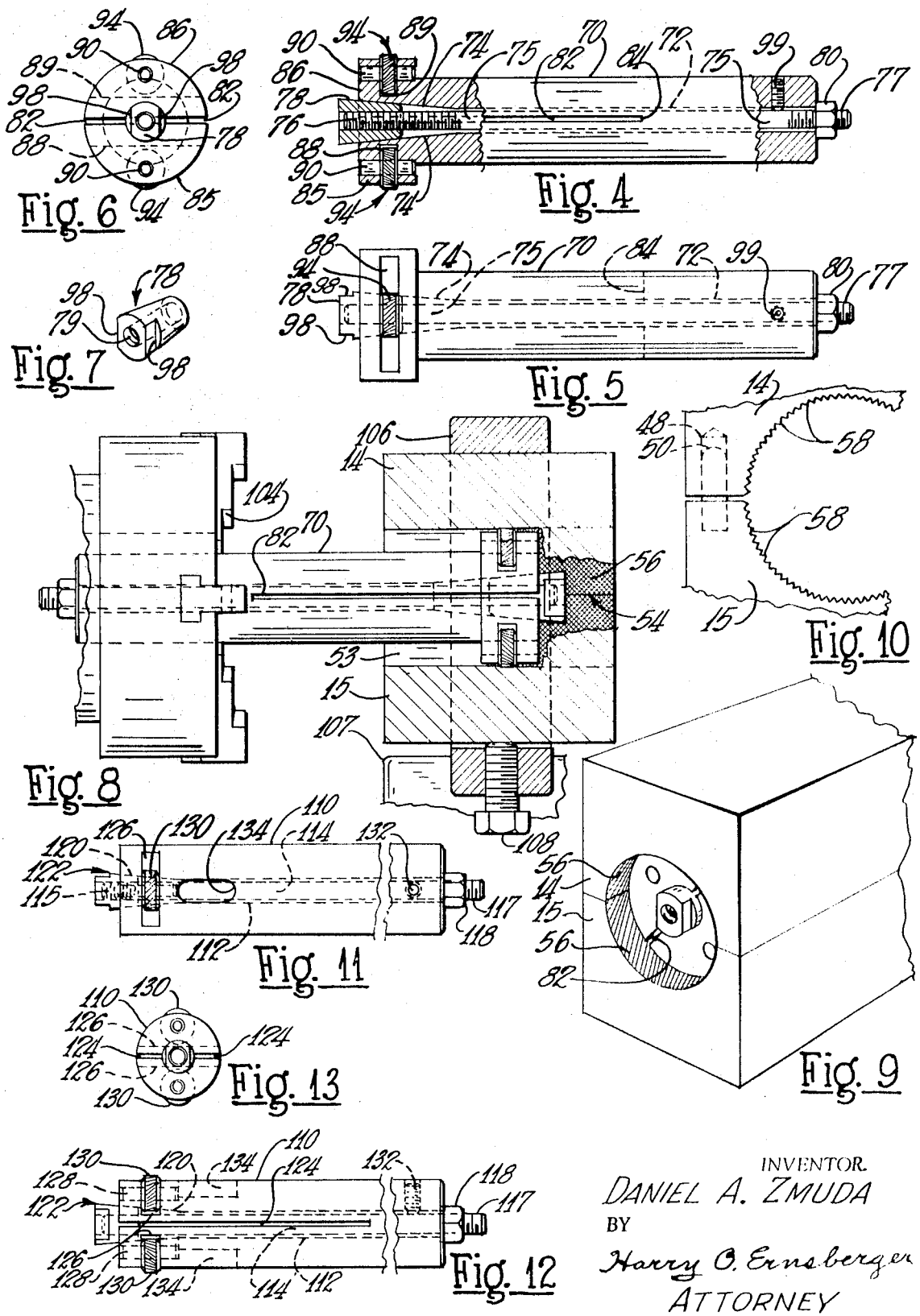

3,587,272

INTERNALLY KNURLED BODY AND METHOD AND APPARATUS FOR FORMING SAME

It has been conventional practice to employ clamping jaws or devices for holding cylindrical or tubular bodies for performing work operations upon the bodies, the clamping devices usually being in the form of blocks or members provided with semicylindrical surfaces in mating relation for engagement with a cylindrical or tubular body for anchoring or holding the body.

The semicylindrical surfaces in the respective blocks or clamp sections have been smooth surfaces for engagement with smooth exterior surfaces of a cylindrical body. With such clamping devices it is necessary to employ tremendous pressures on the clamp sections in an endeavor to prevent slippage between the smooth surface of the cylindrical or tubular body and the smooth interior surfaces of the clamp sections. Even under high clamping pressures, the body engaged by the clamp construction is prone to slip relative to the clamp construction particularly where bending or torque forces are applied to the body.

The invention embraces a clamp construction for clamping cylindrical or tubular metal bodies wherein the clamp body sections are fashioned with internal diamond-shaped knurled surfaces engageable with a cylindrical body for securely holding or anchoring the cylindrical or tubular body against movement or slippage relative to the clamp body sections.

An object of the invention resides in a multisectional clamp construction wherein the clamping sections have curved interior surfaces for engagement with an exterior surface of a cylindrical or tubular body wherein the areas of the curved interior surfaces are fashioned with a diamond-shaped knurled configuration to provide greatly increased frictional engagement with an exterior surface of a cylindrical or tubular body of a character which restrains the body against relative movement with comparatively low clamping pressures exerted on the clamping section.

An object of the invention embraces a multisectional clamp means for clamping cylindrical or tubular bodies wherein each clamp section is fashioned with a semicylindrical recess wherein the curved surface area of each recess is fashioned with a knurled configuration of a character providing a large number of closely spaced pointed projections on the surface areas which, in clamping position, indent the cylindrical surface of the body being clamped whereby greatly increased resistance to relative movement or slippage of the body is attained as compared with the resistance to relative movement of smooth surfaced cylindrical body engaged by conventional smooth surfaced clamp means.

Another object of the invention resides in a method of forming a diamond-shaped knurled internal surface in a cylindrical bore in a body or multisectional body, and controlling the knurling instrumentalities to attain a diamond-shaped knurled configuration of depth and character desired.

Another object of the invention is the provision of a tool or apparatus for imparting diamond-shaped knurling to internal curved surfaces of a section or sections of a clamping means wherein the depth of the knurling is controlled so as to attain a knurled surface fashioned with a large number of diamond-shaped projections on the internal curved surfaces.

Another object of the invention is the provision of or tool for impressing a diamond-shaped knurled configuration in an internal cylindrical surface area wherein the knurling instrumentalities are mounted upon means adjustable to control the impression of internal knurling in the internal cylindrical surface to a desired depth.

Further objects and advantages are within the scope of this invention such as relate to the arrangement, operation and function of the related elements of the structure, to various details of construction and to combinations of parts, elements per se, and to numerous other features as will be apparent from a consideration of the specification and drawing of a form of the invention, which may be preferred, in which:

FIG. 1 is a front elevational view of a body-clamping apparatus illustrating a form of clamping means of the invention illustrated in clamping engagement with a cylindrical or tubular body;

FIG. 2 is a side elevational view of the apparatus shown in FIG. 1;

FIG. 3 is an isometric view of a body clamping means of the character shown in FIGS. 1 and 2;

FIG. 4 is an elevational view, partly in section, of a tool or instrumentality of the invention for performing internal knurling operations;

FIG. 5 is a view similar to FIG. 4 showing the tool rotated through 90°;

FIG. 6 is an end view of the construction shown in FIG. 4;

FIG. 7 is an isometric view of a component of the adjusting means for the knurling elements of the tool;

FIG. 8 is an elevational view, partly in section, of the knurling tool and method of using same;

FIG. 9 is an isometric view showing the relative position of the internal knurling tool disposed within the semicylindrical recesses in mating clamp blocks;

FIG. 10 is a fragmentary view of end portions of the tube clamp sections illustrating the knurled tube engaging surfaces.

FIG. 11 is an elevational view of a knurling instrumentality or tool for knurling a bore or internal cylindrical surface area of lesser diameter;

FIG. 12 is a view similar to FIG. 11 rotated through 90°, and

FIG. 13 is an end view of the construction shown in FIGS. 11 and 12.

The invention has been illustrated for knurling internal surfaces of a bore or internal cylindrical surface area provided in two mating clamp sections particularly for clamping thin-walled tubing to secure the tubing against relative movement during bending operations. It is to be understood that the internal knurling may be applied to a bore or internal cylindrical surface in a single body to provide a roughened or knurled internal surface for frictional engagement with a cylindrical member of solid or tubular character.

The invention has particular utility in securely clamping thin-walled metal tubing, such as tubing used for exhaust pipes for exhaust systems of internal combustion engines to prevent relative movement of the tubing during tube bending or other processing operations performed upon the clamped tube.

Referring to FIGS. 1 through 3 there is illustrated a tube clamping means comprising two mating clamp sections having knurled internal surfaces or surface areas for engagement with the exterior surface of a tube for preventing relative movement of the tube during tube processing operations. FIGS. 1 and 2 illustrate a hydraulic means for actuating a clamp section into engagement with a thin-walled metal tube engaged in a semicylindrical knurled recess in the other section of the clamping means.

The arrangement illustrated in FIGS. 1 and 2 includes a frame 10 provided with a support projection or pad 12 to which is secured a section 14 of a clamping means 16, the section 14 being secured to the projecting pad 12 by means of bolts 18. The frame 10 is fashioned with a second support projection or pad 20 on which is mounted the end head 22 of a cylinder 24 of a fluid actuator 25. The head 22 of the cylinder is secured to the projection 20 by means of bolts 26 which extend through openings in the projection or pad 20 into threaded openings in the cylinder head 22.

The actuator cylinder 24 is provided with an upper head 28. Tubes 29 and 30 are connected through conventional valve means (not shown) for conveying fluid, such as oil, under pressure, alternately to the heads of the actuator.

Reciprocably disposed in the cylinder 24 is a piston 32 secured to a piston rod 34, a pad or member 36 being secured to the piston rod by bolts 37. The pad or member 36 directly supports the lower section 15 of the clamp construction 16.

The clamp section 15 is equipped with a transversely extending T-shaped key 40 secured to the clamp section 15 by a bolt 42. The platform or member 36 is fashioned with a T-shaped slot accommodating the key 40, this means providing for slidable assembly of the clamp section 15 with the support pad 36. The clamping section 15 is secured against relative transverse movement by a plate 44 removably secured to the pad 36 by screws 45, the plate abutting the clamp section 15. The upper clamp section 14 is fashioned with bores 48 and the clamp section 15 provided with dowel pins 50 which snugly, yet slidably fit into the bores 48 for properly aligning the mating clamp sections.

As shown in FIGS. 2, 3 and 9, each of the mating clamp sections 14 and 15 is formed with a semicylindrical recess 52, the recesses constituting a cylindrical bore 53, the sections being preferably bored when they are mated with their planar surfaces 54 and 55 in engaging relation. The interior surfaces of the semicylindrical recesses 52 are provided with a diamond-shaped internal knurled pattern or configuration 56, the method of forming the internal knurling being hereinafter described.

The diamond-shaped internal knurling forms the pipe clamping areas or surfaces, the diamond-shaped knurling providing a plurality of closely-spaced minute projections 58, shown in FIG. 10, the projections extending radially toward the longitudinal axis of the recesses 52 when the clamp sections 14 and 15 are in engaging relation.

FIGS. 1 and 2 illustrate the clamping sections 14 and 15 in clamping engagement with a comparatively thin-walled metal tube 60 of circular cylindrical cross section. Fluid, such as oil under pressure, is delivered beneath the piston 32 of the hydraulic actuator 25 thereby exerting clamping pressure on the clamp section 15 which pressure is transmitted through the tube 60 to the clamp section 14.

The pyramidal or diamond-shaped projections 58 slightly indent the exterior surface area of the tube 60 and serve to securely clamp the tube 60 so that bending operations or other processing operations may be performed on portions of the tube spaced from the clamp sections without slippage of the tube. The indentations formed by the projections 58 are very shallow and do not impair the cylindrical configuration of the tube. Through the clamp means of this character, much less pressure is required to clamp the tube against movement than the pressure required in clamping tubing with smooth surface clamp sections.

It is to be understood that the clamp means may be used for clamping solid cylindrical bodies and tubular members having comparatively thick walls.

The clamp means of the invention has particular utility in clamping exhaust tubing or pipe usable for exhaust gas systems of internal combustion engines during the performance of bending operations or other processing operations upon the tubing or pipe such as end working operations performed upon tubing.

The invention embraces a tool or instrumentality for fashioning the internal knurling in the internal surface of the bore in mating clamp blocks or sections provided by the mating semicylindrical recesses 56. One form of tool or instrumentality for performing the internal knurling operations is illustrated in FIGS. 4 through 7. The tool or instrumentality includes a cylindrical body or holder 70 having a lengthwise internal bore 72 which joins with a frustoconically shaped passage 74, particularly shown in FIG. 4.

Disposed in the bore 72 is a rod or shaft 75 having one end threaded as at 76 and the other end threaded as at 77. Fitting into the frustoconically shaped passage or configuration 74 is a frustoconically shaped or wedge-shaped member 78, the member 78 having a threaded interior bore 79, shown in FIG. 7, engaged by the threaded portion 76 of the rod 75. A nut 80 is threaded onto the threaded portion 77 of the rod 75. The body or holder 70 is fashioned with a slot or kerf 82 which is open-ended at the end of the body adjacent the frustoconically shaped surface of passage 74.

The slot 82 is of a length of several inches preferably from 2 to 6 inches or longer depending upon the length of the holder and the diameter of the bore in the clamp means or sections to be knurled and the amount of expansion of the knurling tools desired in effecting knurling operations. The slot or kerf 82 is at a plane passing through the longitudinal axis of the body or holder 70, the bottom or end of the slot being indicated at 84. An end region of the holder 70 is fashioned with semicylindrical portions 85 and 86 which are of greater diameter than the holder 70 and are separated by the slot 82, the portions 85 and 86 being expandable by the frustoconically shaped wedge member 78.

Portion 85 is fashioned with a transverse slot or recess 88 and portion 86 provided with a transverse slot or recess 89. Diametrically opposed regions of portions 85 and 86 are drilled or bored to accommodate pins or stub shafts 90, the stub shafts being pressed into the bores which are parallel to the axis of the holder 70. Disposed in the slots or recesses 88 and 89 are knurling wheels or members 94 which are freely rotatable on the supporting pins 90.

As shown in FIG. 6, the peripheries of the knurling wheels or instrumentalities 94 project beyond the peripheral surfaces of the portions 85 and 86 for engagement with the internal surface of the bore in the mating sections 14 and 15 which is to be knurled.

The frustoconically wedge member 78 is fashioned with parallel planar surfaces 98 providing a noncircular region to accommodate a tool for rotating the member 78, if desire. The rod 75 may be locked against rotation by a setscrew 99.

FIG. 8 illustrates the method of use of the internal knurling instrumentality. The holder 70 is mounted in a chuck 104 carried by a conventional lathe head or other machine tool having means for rotating the chuck. The mating sections 14 and 15 which, in mating relation define the bore 53, are mounted in a bracket or support means 106 which is equipped with a clamping screw 108 which is drawn up to securely hold the clamp sections 14 and 15 in assembled relation in the positions shown in FIGS. 8 and 9.

The mounting means 106 is preferably supported upon the conventional lengthwise movable tool mounting carriage 107 of the lathe or other machine tool with the knurling wheels or members 94 out of engagement with the clamp sections. The carriage 107 is movable lengthwise of the axis of the chuck by the conventional lead or feed screw (not shown) of the lathe.

The operator adjusts or moves the frustoconically shaped wedge member 78 in a right-hand direction, as viewed in FIG. 4, the wedging action of member 78 spreading the portions 85 and 86 of the holder 70 in lateral directions until the knurling instrumentalities or wheels 94 are spaced so that the peripheries of the knurling wheels will engage and impress a knurling pattern in the surface of the bore 53.

The member 78 may be adjusted by affixing a suitable tool in engagement with the flat faces 98 and rotating the member 78, or adjustment may be made by releasing the setscrew 99 and drawing up the nut 80 to move the rod 75 and the wedge member 78 in a right-hand direction. After the proper expanded adjustment is made for the knurling instrumentalities 94, the setscrew 99 is drawn up to prevent rotation of the rod 75.

The support member 106 carrying the mating sections 14 and 15 is then moved lengthwise into engagement with the knurling wheels 94, the support member 106 being moved lengthwise at a comparatively slow but constant rate in order that the knurling wheels 94 may impart the diamond-shaped knurling indentations or pattern in the internal surfaces defining the semicylindrical recesses 52, the knurling being shown at 56 in FIGS. 8, 9 and 10.

The ridges on the knurling wheel 94 are askew in one direction with respect to the axis of the wheel while the ridges of the opposite knurling wheel are askew in an opposite angular direction whereby the superposing of the knurling patterns of the two knurling wheels results in a diamond-shaped knurling pattern or configuration as shown at 56. The mating sections 14 and 15 and the mounting member 106 are moved lengthwise of the holder 70 until the interior surfaces of the mating sections 14 and 15 are knurled throughout their lengths.

As previously mentioned herein the diamond-shaped knurling pattern provides a great number of pyramidal-shaped projections 58 which slightly indent the surface of a cylindrical body or tube 60 when the body or tube is clamped during work performing or bending operations on the body or tube.

It has been found desirable in order to establish full area contact of the knurled region of the clamp members with a tube 60 in order to secure most effective clamping action, that the clamp sections 14 and 15 be mated as shown in FIGS. 3, 8 and 9 and the internal surface area of the bore knurled in the manner illustrated in FIG. 8. However the sections 14 and 15 may be initially fashioned as a single cubically shaped block and the bore fashioned in the unit block.

The unit block may be mounted in the mounting member 106 and the interior surface of the bore processed by the knurling instrumentalities to provide the knurled interior surface 56. The unit block may then be separated into two clamp sections by severing the block with a thin metal saw.

FIGS. 11 through 13 illustrate an internal knurling instrumentality and mounting arrangement of a character adapted for internally knurling the surface of a bore of comparatively small diameter. In the arrangement shown in FIGS. 11 through 13, the holder or body 110 is normally of cylindrical configuration of the same diameter throughout its length. The holder 110 is fashioned with a bore 112 accommodating a shaft or rod 114 having a threaded portion 115 corresponding to the threaded portion 76 in FIG. 4 and the opposite end region threaded as at 117 to accommodate a nut 118.

The forward region of the bore 112 is provided with a frustoconically shaped passage 120 to receive a frustoconically shaped member or wedge 122 of the same character as the wedge 78 shown in FIG. 4. In this form, the body or holder 110 is fashioned with a slot 124, the slot being open at the end of the body accommodating the wedge 122. The region of the holder 110 adjacent the frustoconically shaped surface 120 is fashioned with diametrically opposed transverse recesses or slots 126. The region of the holder 110 adjacent each slot is fashioned with a bore accommodating a pin or stub shaft 128.

Rotatably mounted on each pin 128 is a knurling wheel or instrumentality 130. The pins 128 are disposed where by the peripheral surfaces of the knurling wheels 130 extend laterally beyond the periphery of the holder 110 a distance sufficient to enable the knurling wheels 130 to engage in a bore provided by recesses in mating clamp sections of the character shown in FIG. 9 without interference with the holder 110. A setscrew 132 is provided for locking the rod 114 in an adjusted position.

The pins 128 are snugly fitted or pressed into the bores in the holder or body 110. Fashioned in the holder or body 110 rearwardly of the ends of the pins 128 are shallow elongated recesses or slots 134. Each slot 134 is adapted to accommodate a tool engageable with the inner end of a pin 128 to drive out the pin in a left-hand direction as viewed in FIGS. 11 and 12 in order to effect replacement of a worn knurling wheel.

The method of forming internal knurling through the use of the arrangement shown in FIGS. 11 through 13 is substantially the same as the method hereinbefore described. The holder 110 is secured in a conventional chuck 104 of a lathe or machine tool and the mating sections of clamp means mounted in a clamp such as the clamp 106 illustrated in FIG. 8, supported on the lengthwise-movable lathe carriage 107 for feeding the clamp sections and the clamp lengthwise of the knurling instrumentalities.

The knurling wheels 130 are adjusted laterally of the axis of the holder 110 by drawing up the wedge 122 either by manipulating of the nut 118 or by a suitable tool applied to the flat surfaces provided on the wedge member 122. By drawing the wedge member 122 in a right-hand direction, as viewed in FIGS. 11 and 12, the wedge member 122 spreads the adjacent region of the holder 110, an action permitted by the slot 124.

The knurling wheels 130 are adjusted so that the peripheries of the knurling wheels will engage the interior semicircular surfaces of the bore in the clamp sections. By rotating the holder 70 and advancing the clamp sections, mounted in bracket 106, lengthwise of the holder, the knurling wheels 130 impart a diamond-shaped knurled configuration to the interior cylindrical shaped surface areas in the clamp sections. The arrangement shown in FIGS. 11 through 13 is usable for internally knurling comparatively small diameter bores in bodies or clamp members.

In the arrangement shown in FIGS. 4 through 7, the portions 85 and 86 of the holder separated by the slot 82 may be of substantially larger diameters than illustrated where it is desired to form internal knurling in a bore in a body or clamp members where a larger diameter internally knurled surface is desired to accommodate tubing of large diameter to be clamped. Through such arrangement tube clamping means embodying the internally knurled configuration of the invention may be fabricated to accommodate tubing or cylindrical bodies of four inches or more in diameter. The internal knurling tools may be adjusted so as to provide either a comparatively shallow or deep internal knurling configuration.

It is apparent that, within the scope of the invention, modifications and different arrangements may be made other than as herein disclosed, and the present disclosure is illustrative merely, the invention comprehending all variations thereof.

I claim:

1. An instrumentality for knurling internal cylindrical surface areas including, in combination, an elongated body, said body having a lengthwise passage wherein a surface portion of the passage adjacent an end region of the body is of tapered configuration, a wedge member extending into the tapered configuration of said passage, means disposed in said passage having engagement with said wedge member, said elongated body having a diametrically disposed slot extending lengthwise through a portion of the body and being open-ended at the end region of the body adjacent the tapered configuration, the exterior region of the body adjacent the tapered configuration having a transverse recess at each side of the slot, pins disposed in openings in the end region of the body adjacent the recesses, and a knurling wheel in each of the transverse recesses supported upon the adjacent pin, said wedge member being adjustable lengthwise of the tapered configuration of the passage for adjusting the transverse position of the knurling wheels relative to the axis of said passage to provide engaging relation of the knurling wheels with an internal surface to be knurled.

2. The combination according to claim 1 wherein the knurling ridges on the respective knurling wheels are askew in opposite directions to effect a diamond-shaped knurled configuration on an internal cylindrical surface to be knurled.

3. The combination according to claim 1 wherein the means in said passage has threaded engagement with a threaded bore in said wedge member, and a locking member for restraining the means in said passage against relative movement.

4. An instrumentality for knurling internal cylindrical surface areas including, in combination, an elongated holder, said holder having a lengthwise passage wherein a surface portion of the passage adjacent an end region of the holder is of tapered configuration, a wedge member engaging the tapered configuration, a rod extending through said passage having a portion in engaging relation with the wedge member, said holder having a diametrically disposed slot extending lengthwise through a portion of the holder and being open ended at the end region of the holder having the tapered configuration, the exterior regions of the holder adjacent the tapered configuration having transverse recesses, pins disposed in openings in the end region of the holder adjacent the recesses, a knurling wheel in each of the holder adjacent the recesses, a knurling wheel in each of the transverse recesses journally supported upon the adjacent pin, said wedge member being movable relative to the holder for adjusting the relative positions of the knurling wheels transversely of the longitudinal axis of the holder.

5. The combination according to claim 4 wherein the rod has threaded engagement in a threaded bore in the wedge member, the opposite end of the rod having a threaded portion extending exteriorly of the holder, a nut threaded on the extending portion, and a locking screw for restraining movement of the said rod relative to the holder.

6. The combination according to claim 4 wherein the holder is shaped adjacent the knurling wheel supporting pins to accommodate means for driving the pins from the openings to change knurling wheels.